(12) United States Patent
He et al.

(10) Patent No.: US 11,506,550 B2
(45) Date of Patent: Nov. 22, 2022

(54) ELECTRIC POWER STEERING DEVICE AND A VEHICLE WITH THE ELECTRIC POWER STEERING DEVICE

(71) Applicant: NEXTEER AUTOMOTIVE (SUZHOU) CO. LTD., Jiangsu (CN)

(72) Inventors: Keyi (Michael) He, Jiangsu (CN); Ying (Charles Yin) Weimin, Jiangus (CN)

(73) Assignee: NEXTEER AUTOMOTIVE (SUZHOU) CO. LTD., Jiangsu (CN)

( * ) Notice: Subject to any disclaimer, the term of this patent is extended or adjusted under 35 U.S.C. 154(b) by 17 days.

(21) Appl. No.: 17/012,469

(22) Filed: Sep. 4, 2020

(65) Prior Publication Data

US 2021/0072102 A1     Mar. 11, 2021

(30) Foreign Application Priority Data

Sep. 9, 2019 (CN) .......................... 201921489681.7

(51) Int. Cl.
*G01L 3/10* (2006.01)
*B62D 1/16* (2006.01)
*B62D 5/04* (2006.01)

(52) U.S. Cl.
CPC ................ *G01L 3/101* (2013.01); *B62D 1/16* (2013.01); *B62D 5/04* (2013.01)

(58) Field of Classification Search
CPC ......... G01L 3/104; G01L 3/101; G01L 5/221; B62D 6/10; B62D 5/0463; B62D 1/16; B62D 5/04

USPC ..................................................... 73/862.335
See application file for complete search history.

(56) References Cited

U.S. PATENT DOCUMENTS

| | | | |
|---|---|---|---|
| 4,984,474 A * | 1/1991 | Matsushima | G01L 3/104 324/207.25 |
| 9,448,129 B2 * | 9/2016 | Yoshida | G01L 3/101 |
| 9,694,847 B2 * | 7/2017 | Yoshida | G01L 5/221 |
| 2011/0000319 A1 * | 1/2011 | Maehara | G01L 3/104 73/862.193 |
| 2018/0106693 A1 * | 4/2018 | Pattok | B62D 5/0406 |
| 2021/0086829 A1 * | 3/2021 | Knoll | B62D 6/10 |

* cited by examiner

*Primary Examiner* — Octavia Davis Hollington
(74) *Attorney, Agent, or Firm* — Dickinson Wright PLLC

(57) ABSTRACT

A device includes a first assist shaft having a first axially extending bore, the first assist shaft engaging, via the first axially extending bore, a first end of a torsion bar. The device may include a flux carrier engaged on an end of the first assist shaft proximate the torsion bar. The device may include a second assist shaft having a second axially extending bore, the second assist shaft engaging, via the second axially extending bore, a second end of the torsion bar and connected to the first assist shaft by the torsion bar. The device may include a permanent magnet ring having an inner circumference that receives an outer circumference of the second assist shaft and the permanent magnet ring disposed in a third axially extending bore of the flux carrier. The device may include a magnetic flux sensor at least partially disposed in the flux carrier.

17 Claims, 4 Drawing Sheets

ELECTRIC POWER STEERING DEVICE AND A VEHICLE WITH THE ELECTRIC POWER STEERING DEVICE

CROSS-REFERENCES TO RELATED APPLICATIONS

This patent application claims priority to China Utility Model Application Serial No. 201921489681.7, filed Sep. 9, 2019, which is incorporated herein by reference in its entirety.

TECHNICAL FIELD

The present disclosure relates to the field of vehicle steering assist devices, and more particularly to an electric power steering device and a vehicle with the electric power steering device.

BACKGROUND OF THE INVENTION

In the development of the car, the steering system has gone through four stages of development: from the original Mechanical Steering (MS) to the Hydraulic Power Steering (HPS), and then the Electricity Controlled Hydraulic Power Steering (EHPS) and Electric Power Steering (EPS).

Electric Power Steering (EPS) is a power steering system that relies directly on the motor to provide auxiliary torque. Compared with the traditional hydraulic power steering system HPS (Hydraulic Power Steering), the EPS system has many advantages. The EPS is mainly composed of a torque sensor, a vehicle speed sensor, a motor, a speed reduction mechanism, and an electronic control unit (ECU).

The basic principle of EPS is that the torque sensor is connected with the steering shaft (pinion shaft). When the steering shaft rotates, the torque sensor starts to work, and the relative rotational angular displacement generated by the input shaft and the output shaft under the action of the torsion bar is transmitted to the ECU as an electric signal, and the ECU determines the rotation direction of the motor and the magnitude of the assist current according to the signals of the vehicle speed sensor and the torque sensor, thereby completing the real-time control of the assist steering. Therefore, it can easily realize different assisting effects of the motor when the vehicle speed is different, and ensure that the car is light and flexible at low speed steering, and stable and reliable when driving at high speed.

FIG. 1 generally illustrates a schematic view of an assembled state of a prior art electric power steering device. As shown in FIG. 1, the existing electric power steering device includes a first auxiliary shaft 1, a second auxiliary shaft 2, a torsion bar 3, a magnetic flux carrier 4, a permanent magnet ring 5, a detecting circuit board 6, and a worm wheel 7. The permanent magnet ring 5 is sleeved or engaged on the first auxiliary shaft 1, the magnetic flux carrier 4 is sleeved or engaged on the second auxiliary shaft 2, and the first auxiliary shaft 1 and the second auxiliary shaft 2 are connected by the torsion bar 3. This type of structure is produced through a complicated pressing process, causing a large number of failures in the factory, and the total height is high, which is not suitable for miniaturization. Moreover, the magnetic flux of the permanent magnet ring 5 will be affected by the residual magnetism from the I-axis, the lower shaft and the equipment fixture, and the detection result is not accurate.

In view of this, the present disclosure provides an electric power steering device and a vehicle with the electric power steering device.

SUMMARY OF THE INVENTION

In view of the problems in the prior art, the present disclosure aims to provide an electric power steering device and a vehicle with the electric power steering device, which simplifies the product structure, has a low overall height, and is convenient for miniaturization. The magnetic flux of the permanent magnet ring is no longer sensitive to the remanence of the I-axis, the lower shaft and the fixture, helping to make the test results more accurate.

An aspect of the disclosed embodiments includes an electric power steering device. The electric power steering device includes a torsion bar and a first assist shaft having a first axially extending bore, the first assist shaft engaging, via the first axially extending bore, a first end of the torsion bar. The electric power steering device may include a flux carrier engaged on an end of the first assist shaft proximate the torsion bar. The electric power steering device may include a second assist shaft having a second axially extending bore, the second assist shaft engaging, via the second axially extending bore, a second end of the torsion bar and connected to the first assist shaft by the torsion bar. The electric power steering device may include a permanent magnet ring having an inner circumference that receives an outer circumference of the second assist shaft and the permanent magnet ring disposed in a third axially extending bore of the flux carrier. The electric power steering device may include a magnetic flux sensor at least partially disposed in the flux carrier.

Another aspect of the disclosed embodiments includes an apparatus may include a first assist shaft having a first axially extending bore adapted to engage a first end of a torsion bar. The apparatus may include a second assist shaft having a second axially extending bore adapted to engage a second end of the torsion bar, the second assist shaft being coupled to the first assist shaft by the torsion bar. The apparatus may include a flux carrier engaged on an end of the first assist shaft proximate the first end of the first assist shaft. The apparatus may include a magnet being at least partially disposed in the flux carrier, the magnet having an inner circumference that receives an outer circumference of the second assist shaft. The apparatus may include a sensor at least partially disposed in the flux carrier, the sensor being configured to sense a magnetic flux associated with the magnet.

Another aspect of the disclosed embodiments includes an electric power steering device is provided, including: a torsion bar; a first assist shaft having a first accommodation space extending axially, the first assist shaft sleeved or engaged on the first end of the torsion bar; a flux carrier, sleeved or engaged on an end of the first assist shaft, the flux carrier having a detection port; a second assist shaft having a second accommodation space extending axially, the second assist shaft sleeved or engaged on the second end of the torsion bar, and connected to the first assist shaft by the torsion bar, a hollow space of the flux carrier forming a ring-shaped third accommodation space; a permanent magnet ring, an inner circumference of the permanent magnet ring sleeved or engaged on an outer circumference of the second assist shaft, and the permanent magnet ring accommodated in a third accommodating space provided by the flux carrier, an the outer circumference of the permanent magnet ring covered by the flux carrier; and a detection board, at least part of the detection board located in a detection port of the flux carrier.

In some embodiments, the first assist shaft has a first end coupled to the second assist shaft and a second end remote from the first end, opening direction of the rod-shaped first accommodation space faces toward the first end of the first assist shaft, an outer circumference of the first end of the first assist shaft is sleeved or engaged on the flux carrier.

In some embodiments, inner wall of the second end of the first assist shaft is provided with a circumferential second retraction shoulder, an inner wall between the second retraction shoulder and the first accommodation space is provided with a circumferential first retraction shoulder that is retracted.

In some embodiments, an inner diameter of the second retraction shoulder is greater than an inner diameter of the first retraction shoulder, and the inner diameter of the first retraction shoulder is greater than an inner diameter of the first accommodation space.

In some embodiments, the second assist shaft has a first end coupled to the first assist shaft and a second end facing away from the first end, the opening direction of the rod-shaped second accommodation space faces toward the first end of the second assist shaft, a first annular extension shoulder, a second annular extension shoulder, and a third annular extension shoulder are sequentially provided from the outer wall of the first end to the second end of the second assist shaft.

In some embodiments, a bushing is provided between an inner circumferential surface of the first retraction shoulder of the first assist shaft and an outer wall of the first end of the second assist shaft.

In some embodiments, the permanent magnet ring is sleeved or engaged on an outer circumference of the second annular extension shoulder.

In some embodiments, a worm gear is disposed on an outer circumference of the third annular extension shoulder, an outlet of a third accommodation space of the flux carrier is covered by the worm gear, and the permanent magnet ring is encapsulated in a third accommodation space of the flux carrier, and the worm gear is engaged with a worm.

In some embodiments, the permanent magnet ring is a magnetic polarity wheel, and the detection board is a magnetoresistive sensor.

Another aspect of the disclosed embodiments includes a vehicle with an electric power steering device is provided, including: the electric power steering device as described above, wherein a second end of the first assist shaft is screwed to a steering wheel of the vehicle and the first assist shaft rotates coaxially with the steering wheel.

The object of the present disclosure is to provide an electric power steering device and a vehicle with the electric power steering device, which simplifies the product structure, has a low total height, and is convenient for miniaturization. The magnetic flux of the permanent magnet ring is no longer sensitive to the remanence of the I-axis, the lower shaft and the equipment fixture, helping to make the test results more accurate.

BRIEF DESCRIPTION OF THE DRAWINGS

Other features, objects, and advantages of the present disclosure will become apparent from the Detailed Description of Description.

DETAILED DESCRIPTION

Figure 1:
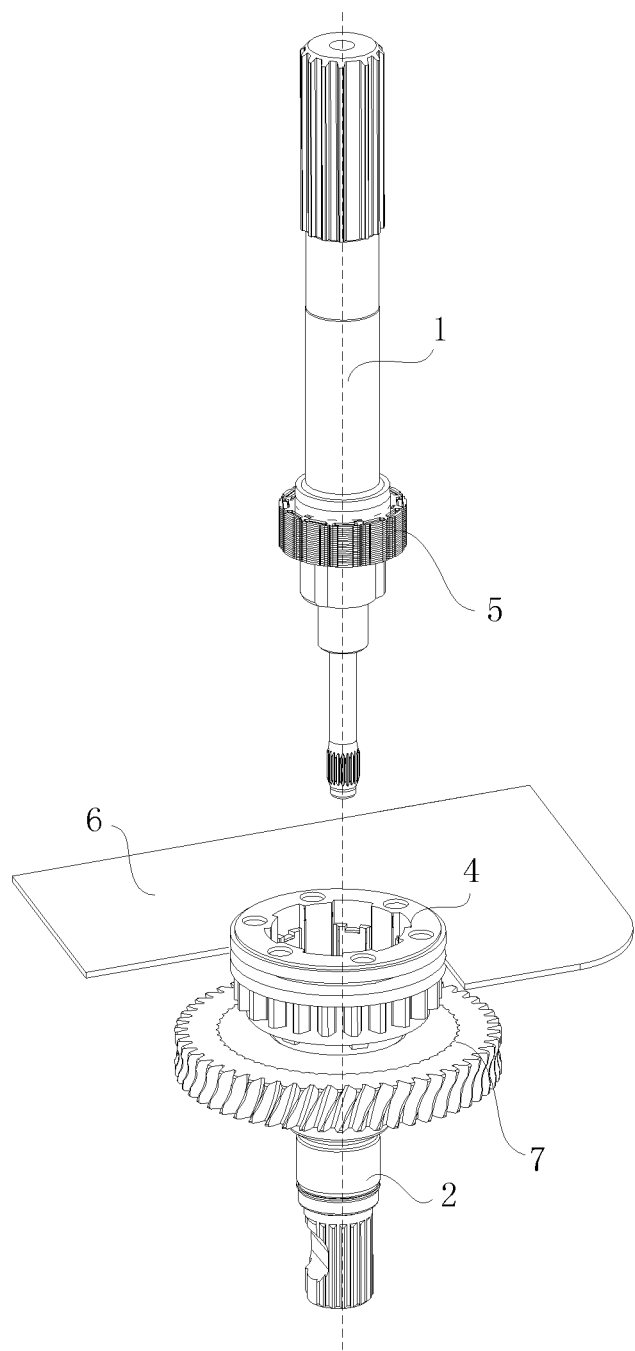
FIG. 1 generally illustrates a schematic view of an assembled state of a prior art electric power steering device.

Exemplary embodiments will now be described more fully with reference to the accompanying drawings. Exemplary embodiments can be embodied in many forms and should not be construed as being limited to the embodiments set forth herein. Rather, these embodiments are provided so that this disclosure will be thorough and complete. The same reference numerals in the drawings refer to same or similar structures, and a repetitive description thereof will be omitted.

Figure 2:
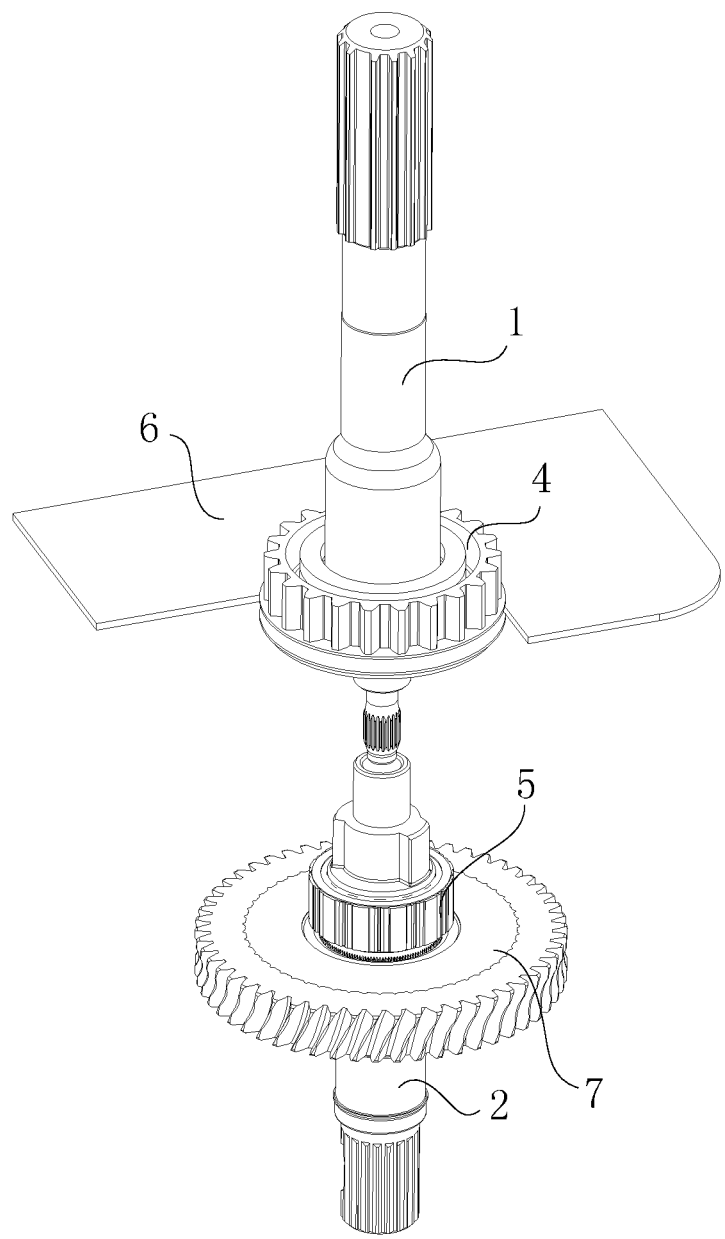
FIG. 2 generally illustrates a schematic view showing an assembled state of an electric power steering device according to the principles of the present disclosure.
Figure 3:
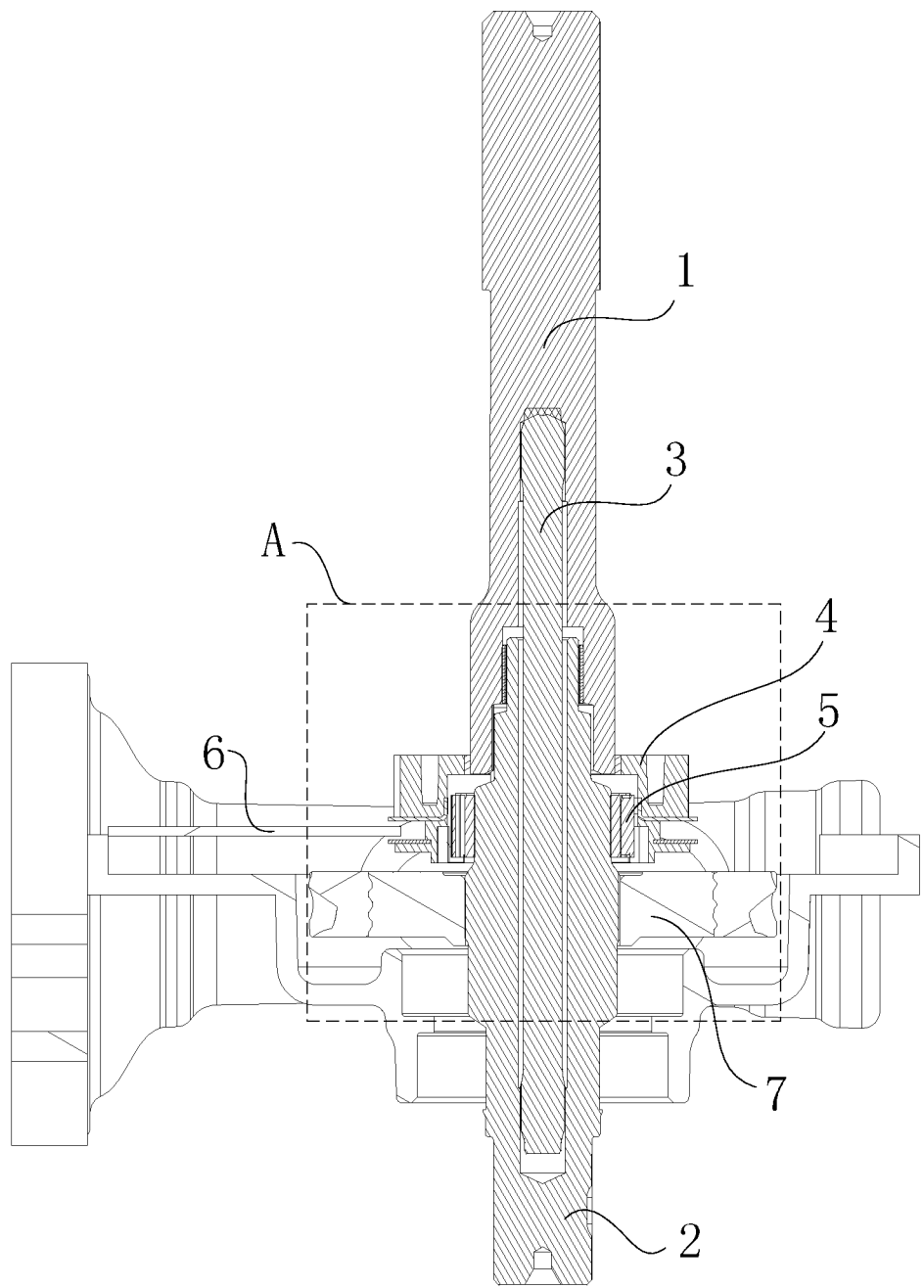
FIG. 3 generally illustrates a cross-sectional view of an electric power steering device according to the principles of the present disclosure.
Figure 4:
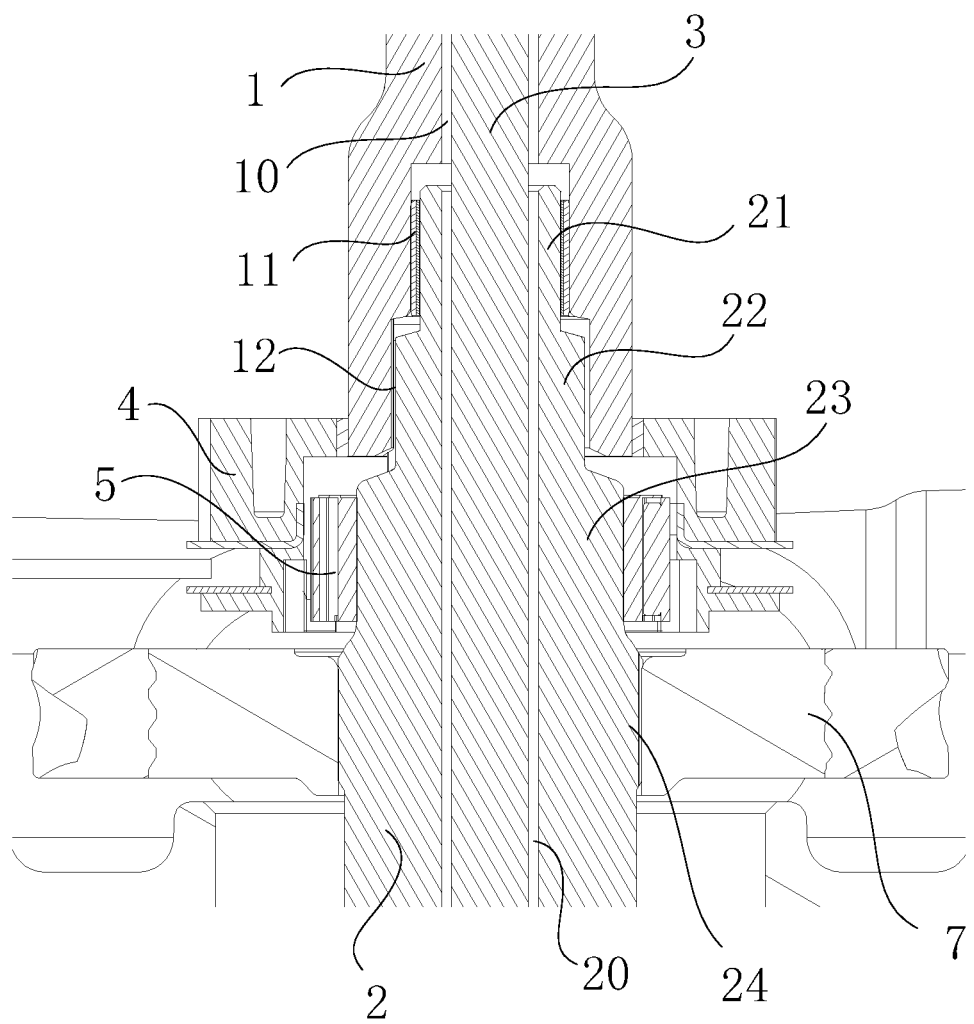
FIG. 4 generally illustrates an enlarged view of a region A in FIG. 3.

FIG. 2 generally illustrates a schematic view showing an assembled state of an electric power steering device according to the principles of the present disclosure. FIG. 3 generally illustrates a cross-sectional view of an electric power steering device according to the principles of the present disclosure. FIG. 4 generally illustrates an enlarged view of a region A in FIG. 3. As is generally illustrated in FIGS. 2 to 4, an electric steering apparatus of according to the principles of the present disclosure includes: a first assist shaft 1, a second assist shaft 2, a torsion bar 3, a flux carrier 4, a permanent magnet ring 5, a detection board 6, and a worm gear 7. Wherein the first assist shaft 1 has a first accommodation space 10 extending axially, the first assist shaft 1 is sleeved or engaged on the first end of the torsion bar 3. The first accommodation space 10 may be referred to herein as a first axially extending bore 10. The flux carrier 4 is sleeved or engaged on an end of the first assist shaft 1, the flux carrier 4 has a detection port. The second assist shaft 2 has a second accommodation space 20 extending axially, the second assist shaft 2 is sleeved or engaged on the second end of the torsion bar 3, and the second assist shaft 2 is connected to the first assist shaft 1 by the torsion bar 3, the flux carrier 4 has a hollow space forming a ring-shaped third accommodation space. The second accommodation space 20 may be referred to herein as a second axially extending bore 20. The third accommodation space may be referred to herein as third axially extending bore. An inner circumference of the permanent magnet ring 5 is sleeved or engaged on an outer circumference of the second assist shaft 2, and the permanent magnet ring 5 is accommodated in the third accommodating space provided by the flux carrier 4, the outer circumference of the permanent magnet ring 5 is covered by the flux carrier 4.

In some embodiments, the permanent magnet ring 5 is a magnetic polarity wheel, and the detection board 6 may include a magnetoresistive sensor, a magnetic flux sensor, a torque sensor, and/or other suitable sensor. The detection board 6 may be referred to herein as a sensor or a detection circuit board. The detection board 6 may include any suitable sensing mechanism configured to sense a magnetic flux. For example, at least part of the detection circuit board 6 is located in the detection port of the flux carrier 4; to detect the change in the magnetic flux, thereby obtaining the steering torque of the first auxiliary shaft 1. The worm gear 7 is set on the second assist shaft 2.

In some embodiments, the flux carrier 4 and the first assist shaft 1 are formed by overmolding, and the permanent magnet ring 5 and the second assist shaft 2 are formed by overmolding, but not limited thereto. Because the worm gear 7 covers the outlet of the third accommodating space of the flux carrier 4, the permanent magnet ring 5 is packaged in the third accommodating space of the flux carrier 4, thereby simplifying the product structure, the overall height is low, and the miniaturization is facilitated. The magnetic flux of the permanent magnet ring is no longer sensitive to the remanence of the I-axis, the lower shaft and the equipment fixture, which helps to make the test results more accurate.

The first assist shaft 1 has a first end coupled to the second assist shaft 2 and a second end remote from the first end, opening direction of the rod-shaped first accommodation space 10 faces toward the first end of the first assist shaft 1, the outer circumference of the first end of the first assist shaft 1 is sleeved or engaged on the flux carrier 4, but is not limited thereto. The inner wall of the second end of the first assist shaft 1 is provided with a circumferential second retraction shoulder 12, an inner wall between the second retraction shoulder 12 and the first accommodation space 10 is provided with a circumferential first retraction shoulder 11 that is retracted. An inner diameter of the second retraction shoulder 12 is greater than an inner diameter of the first retraction shoulder 11, and an inner diameter of the first retraction shoulder 11 is greater than an inner diameter of the first accommodation space 10.

The second assist shaft 2 has a first end coupled to the first assist shaft 1 and a second end facing away from the first end, the opening direction of the rod-shaped second accommodation space 20 faces toward the first end of the second assist shaft 2, a first annular extension shoulder 22, a second annular extension shoulder 23, and a third annular extension shoulder 24 are sequentially provided from the outer wall 21 of the first end to the second end of the second assist shaft 2, but is not limited thereto. In some embodiments, the outer diameter of the first annular extension shoulder 22 is larger than the outer diameter of the outer wall 21 of the first end of the second assist shaft 2. The outer diameter of the second annular extension shoulder 23 is greater than the outer diameter of the first annular extension shoulder 22. The outer diameter of the third annular extension shoulder 24 is greater than the outer diameter of the second annular extension shoulder 23.

A bushing is provided between an inner circumferential surface of the first retraction shoulder 11 of the first assist shaft 1 and an outer wall 21 of the first end of the second assist shaft 2. The permanent magnet ring 5 is sleeved or engaged on an outer circumference of the second annular extension shoulder 23. The worm gear 7 is disposed on an outer circumference of the third annular extension shoulder 24, and an outlet of a third accommodation space of the flux carrier 4 is covered by the worm gear 7. The permanent magnet ring 5 is encapsulated in a third accommodation space of the flux carrier 4, and the worm gear 7 is engaged with a worm.

According to another aspect of the present disclosure, a vehicle with an electric power steering device is provided, including: the electric power steering device as described above, wherein a second end of the first assist shaft 1 is screwed to the steering wheel of the vehicle, and the first assist shaft 1 rotates coaxially with the steering wheel.

In some embodiments, an electric power steering device and a vehicle with the electric power steering device, which simplifies the product structure, has a low total height, and is convenient for miniaturization. The magnetic flux of the permanent magnet ring is no longer sensitive to the remanence of the I-axis, the lower shaft and the equipment fixture, helping to make the test results more accurate.

In some embodiments, an electric power steering device includes a torsion bar and a first assist shaft having a first axially extending bore, the first assist shaft engaging, via the first axially extending bore, a first end of the torsion bar. The electric power steering device may include a flux carrier engaged on an end of the first assist shaft proximate the torsion bar. The electric power steering device may include a second assist shaft having a second axially extending bore, the second assist shaft engaging, via the second axially extending bore, a second end of the torsion bar and connected to the first assist shaft by the torsion bar. The electric power steering device may include a permanent magnet ring having an inner circumference that receives an outer circumference of the second assist shaft and the permanent magnet ring disposed in a third axially extending bore of the flux carrier. The electric power steering device may include a magnetic flux sensor at least partially disposed in the flux carrier.

In some embodiments, the first assist shaft includes a first end coupled to the second assist shaft and a second end opposite the first end, and wherein an opening of the first axially extending bore is disposed proximate the first end of the first assist shaft. In some embodiments, an outer circumference of the first end of the first assist shaft is engaged by the flux carrier. In some embodiments, an inner wall of the second end of the first assist shaft includes a circumferential second retraction shoulder. In some embodiments, an inner wall between the second retraction shoulder and the first axially extending bore defines a circumferential first retraction shoulder that is retracted. In some embodiments, an inner diameter of the second retraction shoulder is greater than an inner diameter of the first retraction shoulder and the inner diameter of the first retraction shoulder is greater than an inner diameter of the first axially extending bore. In some embodiments, the second assist shaft includes a first end coupled to the first assist shaft and a second end facing away from the first end, an opening of the second axially extending bore faces toward the first end of the second assist shaft.

In some embodiments, a first annular extension shoulder, a second annular extension shoulder, and a third annular extension shoulder are sequentially disposed from the outer wall of the first end to the second end of the second assist shaft. In some embodiments, a bushing is provided between an inner circumferential surface of the first retraction shoulder of the first assist shaft and an outer wall of the first end of the second assist shaft. In some embodiments, the permanent magnet ring is engaged by an outer circumference of the second annular extension shoulder. In some embodiments, a worm gear is disposed on an outer circumference of the third annular extension shoulder.

In some embodiments, an outlet of the third axially extending bore of the flux carrier is covered by the worm gear and the worm gear is engaged by a worm. In some embodiments, the permanent magnet ring is encapsulated in the third axially extending bore of the flux carrier. In some embodiments, the permanent magnet ring includes a magnetic polarity wheel. In some embodiments, the magnetic flux sensor includes a magnetoresistive sensor. In some embodiments, a second end of the first assist shaft is fixedly attached to a steering wheel of a vehicle. In some embodiments, the first assist shaft rotates coaxially with the steering wheel.

In some embodiments, an apparatus may include a first assist shaft having a first axially extending bore adapted to engage a first end of a torsion bar. The apparatus may include a second assist shaft having a second axially extending bore adapted to engage a second end of the torsion bar, the second assist shaft being coupled to the first assist shaft by the torsion bar. The apparatus may include a flux carrier engaged on an end of the first assist shaft proximate the first end of the first assist shaft. The apparatus may include a magnet being at least partially disposed in the flux carrier, the magnet having an inner circumference that receives an outer circumference of the second assist shaft. The apparatus may include a sensor at least partially disposed in the flux carrier, the sensor being configured to sense a magnetic flux associated with the magnet.

In some embodiments, the magnet includes a permanent magnet. In some embodiments, the sensor includes a magnetoresistive sensor.

In some embodiments, an electric power steering device and a vehicle with the electric power steering device, the electric power steering device includes: a torsion bar; a first assist shaft sleeved on the first end of the torsion bar; a flux carrier, sleeved on an end of the first assist shaft, the flux carrier having a detection port; a second assist shaft sleeved on the second end of the torsion bar, and connected to the first assist shaft by the torsion bar, the flux carrier being hollow to form a ring shape third accommodation space; a permanent magnet ring, an inner circumference of the permanent magnet ring sleeved on an outer circumference of the second assist shaft, and the permanent magnet ring accommodated in a third accommodating space provided by the flux carrier, the outer circumference of the permanent magnet ring covered by the flux carrier; a detection board, at least part of the detection board located in a detection port of the flux carrier. The utility model simplifies the product structure, has a low total height, and is convenient for miniaturization, the magnetic flux of the permanent magnet ring is no longer sensitive to the residual magnetism of the T-axis, the lower shaft and the equipment fixture, and helps to make the detection result more accurate.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

The invention claimed is:

1. An electric power steering device, including:
a torsion bar;
a first assist shaft having a first axially extending bore, the first assist shaft engaging, via the first axially extending bore, a first end of the torsion bar;
a flux carrier engaged on an end of the first assist shaft proximate the torsion bar;
a second assist shaft having a second axially extending bore, the second assist shaft engaging, via the second axially extending bore, a second end of the torsion bar and connected to the first assist shaft by the torsion bar;
a permanent magnet ring having an inner circumference that receives an outer circumference of the second assist shaft and the permanent magnet ring disposed in a third axially extending bore of the flux carrier, wherein an outer circumference of the permanent magnet ring is covered by the flux carrier, and wherein the permanent magnet ring includes a magnetic polarity wheel; and
a magnetic flux sensor at least partially disposed in the flux carrier, wherein the magnetic flux sensor includes a magnetoresistive sensor.

2. The electric power steering device of claim 1, wherein the first assist shaft includes a first end coupled to the second assist shaft and a second end opposite the first end, and wherein an opening of the first axially extending bore is disposed proximate the first end of the first assist shaft.

3. The electric power steering device of claim 2, wherein an outer circumference of the first end of the first assist shaft is engaged by the flux carrier.

4. The electric power steering device of claim 2, wherein an inner wall of the second end of the first assist shaft includes a circumferential second retraction shoulder.

5. The electric power steering device of claim 4, wherein an inner wall between the second retraction shoulder and the first axially extending bore defines a circumferential first retraction shoulder that is retracted.

6. The electric power steering device of claim 5, wherein an inner diameter of the second retraction shoulder is greater than an inner diameter of the first retraction shoulder and the inner diameter of the first retraction shoulder is greater than an inner diameter of the first axially extending bore.

7. The electric power steering device of claim 5, wherein the second assist shaft includes a first end coupled to the first assist shaft and a second end facing away from the first end, an opening of the second axially extending bore faces toward the first end of the second assist shaft.

8. The electric power steering device of claim 7, wherein a first annular extension shoulder, a second annular extension shoulder, and a third annular extension shoulder are sequentially disposed from the outer wall of the first end to the second end of the second assist shaft.

9. The electric power steering device of claim 8, wherein a bushing is provided between an inner circumferential surface of the first retraction shoulder of the first assist shaft and an outer wall of the first end of the second assist shaft.

10. The electric power steering device of claim 8, wherein the permanent magnet ring is engaged by an outer circumference of the second annular extension shoulder.

11. The electric power steering device of claim 8, wherein a worm gear is disposed on an outer circumference of the third annular extension shoulder.

12. The electric power steering device of claim 11, wherein an outlet of the third axially extending bore of the flux carrier is covered by the worm gear, and wherein the worm gear is engaged by a worm.

13. The electric power steering device of claim 1, wherein the permanent magnet ring is encapsulated in the third axially extending bore of the flux carrier.

14. The electric power steering device of claim 1, wherein a second end of the first assist shaft is fixedly attached to a steering wheel of a vehicle.

15. The electric power steering device of claim 14, wherein the first assist shaft rotates coaxially with the steering wheel.

16. An apparatus, including:
a first assist shaft having a first axially extending bore adapted to engage a first end of a torsion bar;
a second assist shaft having a second axially extending bore adapted to engage a second end of the torsion bar, the second assist shaft being coupled to the first assist shaft by the torsion bar;
a flux carrier engaged on an end of the first assist shaft proximate the first end of the first assist shaft;
a magnet being at least partially disposed in the flux carrier, the magnet having an inner circumference that receives an outer circumference of the second assist shaft, wherein an outer circumference of the magnet is covered by the flux carrier, and wherein the magnet includes a magnetic polarity wheel; and a sensor at least partially disposed in the flux carrier, the sensor being configured to sense a magnetic flux associated with the magnet, wherein the sensor includes a magnetoresistive sensor.

17. The apparatus of claim 16, wherein the magnet includes a permanent magnet.

* * * * *